(No Model.)
I. B. POTTS.
DETACHABLE PIPE COUPLING.
No. 424,129. Patented Mar. 25, 1890.
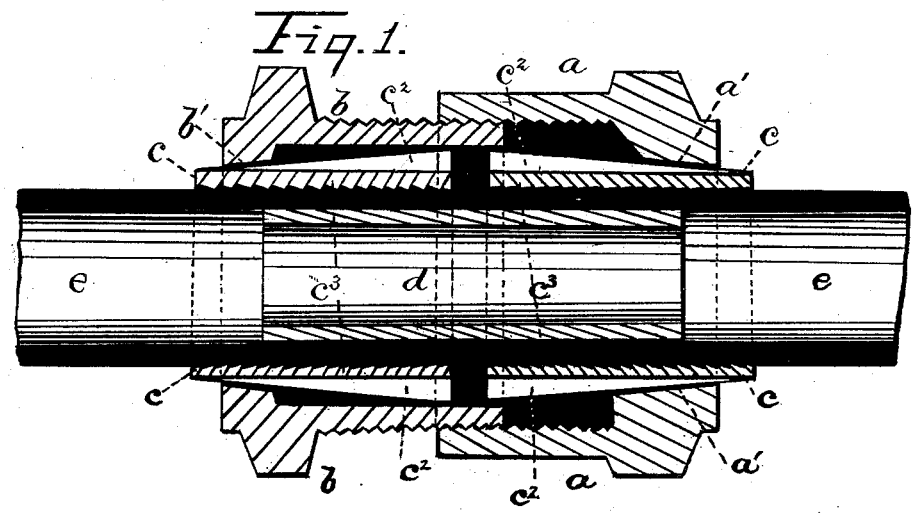
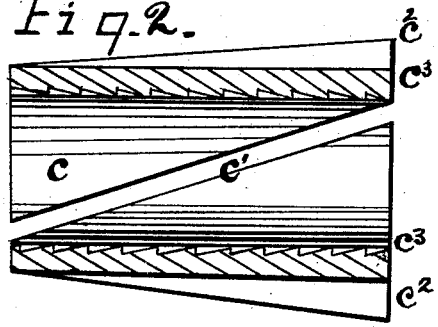
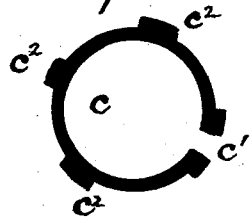
Witnesses:
Wm. H. Brereton
K. Brereton
Inventor:
Isaac B. Potts
By J. W. Tallmadge
Attorney.

UNITED STATES PATENT OFFICE.

ISAAC B. POTTS, OF COLUMBUS, OHIO.

DETACHABLE PIPE-COUPLING.

SPECIFICATION forming part of Letters Patent No. 424,129, dated March 25, 1890.

Application filed October 26, 1889. Serial No. 328,301. (No model.)

*To all whom it may concern:*

Be it known that I, ISAAC B. POTTS, a citizen of the United States, residing at Columbus, in the county of Franklin and State of Ohio, have invented a new and useful Improvement in Detachable Pipe-Couplings, of which the following is a specification.

My invention is an improvement in detachable pipe-couplings; and my said invention consists in certain details of construction of the parts composing the same, as and for the purposes as will be hereinafter more particularly described and form the subject-matter of the annexed claim.

The object of this invention is to provide a simple and convenient coupling whereby the ends of pipe may be quickly and easily joined without the use of solder, cement, or packing, and to this end I proceed as follows, reference being had to the accompanying drawings, forming a part hereof, wherein—

Figure 1 is a view in central sectional elevation of a detachable pipe-coupling constructed according to my invention; and Figs. 2 and 3, detached views, on an enlarged scale, of the rings, showing the construction thereof.

The letter $a$ indicates the coupling-nut; $b$, the sleeve; $c\ c$, the rings, and $d$ the core-pipe. $e\ e$ are the adjacent ends of the pipe being united.

The coupling-nut $a$ and sleeve $b$ each have screw-threaded ends, by which they are united, and at their opposite ends are formed with an interior tapered shoulder, as at $a'$ and $b'$, respectively. The rings $c\ c$ are each of like construction, are of substantially cylindrical form, and longitudinally split or divided diagonally, as at $c'$, for the purpose as will presently appear. Extending longitudinally of the rings $c\ c$ are formed integral therewith inclined or tapered splines or ribs $c^2$, and the interior surface of the rings is corrugated, as at $c^3$.

To apply the coupling, the nut $a$ and sleeve $b$ are first run upon the ends of the pipe to be united. The rings $c\ c$ are next also placed upon the ends of the pipe within the nut and sleeve, and then the core-pipe $d$ is placed in position within the ends of the pipe. The nut $a$ is now screwed upon the sleeve $b$, which draws these parts together, and with their interior tapered ends $a'\ b'$ riding upon and up the inclined ribs $c^2$ of the rings $c\ c$. The incline of the shoulders $a'$ and $b'$ of the sleeve $b$ and nut $a$ are the same as the incline of the ribs $c^2$ of the rings $c\ c$, and the exterior openings of said nut and sleeve are only just sufficient to admit the outer ends of the rings $c\ c$. When, therefore, the nut and sleeve are drawn together by the action of their screw-threaded portion, lateral pressure is exerted by the tapered ends $a'$ and $b'$ of said nut and sleeve upon the inclined ribs $c^2$ of the rings $c\ c$, so that as said nut and sleeve advance to each other the rings $c\ c$ are compressed upon the pipe $e\ e$ and the same securely held upon the core-pipe $d$. The interior corrugations of the rings $c\ c$ prevent the longitudinal displacement of the pipe, and should the pipe become loose a simple movement of the nut will bring it and the sleeve together and to a new position upon the inclined ribs of the rings, so that said rings will be again compressed upon the core-pipe.

By reason of the incline ribs on the rings less metal is required than were the rings simply tapered from end to end, and there is less friction between the nut and sleeve and said rings. Consequently less exertion is necessary to adjust the coupling. The ribs also tend to strengthen the rings, and by reason of said rings being longitudinally divided or split at an angle they may be used upon various sizes of pipe, and continued adjustment or compression of the said sleeves may be continued even after the edges of the slot come together. Because of the taper given to said slot the edges of the rings will slip upon each other and continue to exert pressure upon the pipe.

Because of the ribs the body of the rings need not be made so heavy as would be the case were the rings simply of tapered form, and as a separate ring is used upon each end of the pipe being coupled pipes of different diameters may be united, which would not be possible were the ring continued across the ends of both pipes.

I claim—

The combination, in a detachable pipe-coupling, with the coupling nut and sleeve having tapered shouldered exterior ends, the rings with corrugations upon their interior, inclined ribs, and diagonally split or divided longitudinally, and core-pipe, all constructed and arranged substantially as described and shown, for the purposes specified.

ISAAC B. POTTS.

Witnesses:
L. L. RANKIN,
LOA B. BROWN.